US007620944B2

(12) United States Patent
Beccario et al.

(10) Patent No.: US 7,620,944 B2
(45) Date of Patent: Nov. 17, 2009

(54) RESOLVING OPERATORS WITH USER DEFINED OPERANDS

(75) Inventors: Cameron Beccario, Seattle, WA (US); Paul Vick, Seattle, WA (US); Harish Venkata Kantamneni, Bellevue, WA (US); Amanda Silver, Seattle, WA (US); John Hamby, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 10/699,327

(22) Filed: Oct. 31, 2003

(65) Prior Publication Data

US 2005/0097532 A1     May 5, 2005

(51) Int. Cl.
*G06F 9/45*     (2006.01)
(52) U.S. Cl. .................. 717/141; 717/117
(58) Field of Classification Search ......... 717/106–119, 717/136–144
See application file for complete search history.

(56) References Cited

OTHER PUBLICATIONS

Microsoft, "C# Language Specification", May 2001, Microsoft Corporation, Version 0.28, pp. i-xiii, 1-362.*

Baker, T.P., "A One-Pass Algorithm for Overload Resolution in Ada", *ACM Transactions on Programming Languages and Systems (TOPLAS)*, 1982, 4(4), 601-614.

Neubauer, M. et al., "Functional Logic Overloading", *Annual Symposium on Principles of Programming Languages, Proceedings of the 29th ACM SIGPLAN-SIGACT Symposium on Principles of Programming*, 2002, 233-244.

* cited by examiner

*Primary Examiner*—Ted T Vo
(74) *Attorney, Agent, or Firm*—Woodcock Washburn LLP (57) ABSTRACT

Techniques are disclosed to support the resolution of an operator which has been called with inconsistent typing and at least one operand of a user-defined type. In order to allow the compilation of such an operation, first all possible widening conversions for each operand are examined to determine if any widening conversions of any operands would result in types over which the operator is defined. If not, both the narrowing and the widening conversions of each operand are considered, to determine if any conversions of either or both operands would result in types for which the operator is defined. If only widening conversions are used, the most encompassed possible result type is selected as the target type. If a narrowing conversion is used, the most encompassing possible result type is selected as the target type. In order to use the target type, each operand is converted to the target type. The operation is then performed using the converted operands.

24 Claims, 5 Drawing Sheets

RESOLVING OPERATORS WITH USER DEFINED OPERANDS

FIELD OF THE INVENTION

This invention relates in general to the field of compiling computer programs. More particularly, this invention relates to resolving operators when used with a user-defined operand.

BACKGROUND OF THE INVENTION

Data Typing and Operators

Different computer languages impose different constraints on programmers creating computer programs. Typing is one area in which constraints may be imposed by a computer language. Typing refers to the assignment to a variable of a specific data type. Expressions which are evaluated will also be of a specific data type.

Data types may be built-in to the language (often, for example, built-in types include String, Integer, and Long types). Types which are built in to the language are known as intrinsic types. In addition to intrinsic types, in some languages, data types may be defined by a user. The data type of a programming element refers to what kind of data it can hold and how that data is stored. Data types apply to all values that can be stored in computer memory or participate in the evaluation of an expression.

In many languages, built-in and user-defined operators are also provided. An operator performs some pre-defined operation on one or more expressions. For example, in one language, an operator "+" may be a binary operator. A binary operator works on two expressions. In most languages, an expression may be a constant, a variable, or a more complex expression. Expressions have types, and operators are defined to work on specific types. Thus the "bar" operator may be defined only over expressions of type Integer, allowing the operation "x bar y" only if x and y are both Integer type. An operator may also be defined in different cases. For example the operator "foo" may be defined for "x foo y" in all situations shown in Table 1:

TABLE 1

Possible types for x and y in expression "x foo y"

| Type for x | Type for y | Result |
| --- | --- | --- |
| Integer | Integer | Integer |
| String | String | String |
| Double | Double | Double |

The "foo" operator thus can be used with several different types, as shown above. When an operator may be used with operands of different types, it is termed an overloaded operator. When the foo operator is used with a first and second operand that are of type Integer, the result is an Integer. As another example of operators which can work on operands of different types, in a given language the "+" operator can be used both to add integers and to concatenate strings. A user who has defined a user-defined type may also define an operation for use with that user-defined type.

Overloading a method allows a programmer to keep an interface consistent, and allows the programmer to logically call the same method regardless of the types of data being passed in. Using the same name promotes simplicity—it lets a programmer remember what a procedure does, as opposed to having to come up with new names or a naming convention to help keep things straight.

A language may specify (or allow user-defined specification of) a way of changing a value from one data type to another data type. This process is called type conversion. Type conversion is also known as "casting." An important characteristic of a type conversion is whether the result of the conversion is within the range of the destination data type. A widening conversion changes a value from one data type to another data type, where the second data type can accommodate any possible value of the original data. A narrowing conversion changes a value from a first data type to a second data type, where that second data type might not be able to hold some of the possible values which can be expressed in the first data type. Thus, in a narrowing conversion, data might be lost.

The following Table 2 shows an example of standard widening conversions, in this case conversions which are standard in the Visual Basic language:

TABLE 2

Widening Conversions in Visual Basic

| Data type | Widens to data types |
| --- | --- |
| Byte | Byte, Short, Integer, Long, Decimal, Single, Double |
| Short | Short, Integer, Long, Decimal, Single, Double |
| Integer | Integer, Long, Decimal, Single, Double |
| Long | Long, Decimal, Single, Double |
| Decimal | Decimal, Single, Double |
| Single | Single, Double |
| Double | Double |
| Any enumerated type | Its underlying integer type and any type to which that widens |
| Char | Char, String |
| Any type | Object |
| Any derived type | Any base type from which it is derived |
| Any type | Any interface it implements |

Conversions from Integer to Single, from Long to Single or Double, or from Decimal to Single or Double might result in loss of precision, but never in loss of magnitude. In this sense they do not incur information loss.

As seen in Table 2, a conversion from a derived type to one of its base types is widening. This is because the derived type contains all the members of the base type, so it qualifies as an instance of the base type. In the opposite direction, the base type does not have the members defined by the derived type.

Some standard narrowing conversions include:

The reverse directions of the widening conversions

Conversions in either direction between Boolean and any numeric type

Any numeric type to any enumerated type

Conversions in either direction between a Char( ) array and a String

Conversions in either direction between String and any numeric type, Boolean, or Date Conversions from a data type or object type to a type derived from it In some languages, including Visual Basic, when users are allowed to create user-defined types, users can also define narrowing and widening conversions to or from these user-defined types. These conversions may be to or from other user-defined types, or to or from intrinsic types.

Typing of Languages and Operator Overloading

A strongly-typed language is a computer language in which there can not be type-inconsistencies. The compiler for a strongly-typed language will examine each expression in a program being compiled, and will verify that the expression does not attempt to use an operator with inconsistent expressions. An expression which includes inconsistent types will likely trigger a compilation error, and the compiler will return with errors rather than completing the compilation of the program.

If a language is not strongly-typed, expressions may be inconsistently typed. This allows more flexibility for a user. However, if the language is not strongly-typed, a compiler must have some way of determining how to evaluate an inconsistent expression. One way to do this is by using widening conversions. In the example of the "foo" operator discussed above, if the loosely-typed language encounters the expression "byte1 foo byte2", where byte1 and byte2 are of type Byte, the expression is inconsistently typed, as can be seen by referring to Table 1, which does not include an entry for using foo with two expressions of type Byte. However, if there is a widening conversion from Byte to Integer (as there is, for example, in Visual Basic, see Table 2) then this conversion can be used, and the operation can be completed.

However, where a user-defined type is used, and the user has not defined the operator over the user-defined type, this resolution will fail. This is irrespective of whether the user defined type has a conversion to any of the intrinsic types for which this operator is defined.

In order to provide flexibility for users, a language may maintain a commitment to allowing certain operators to be used with a wide number of types, including user-defined types. When this is not possible, the language fails in its commitment. Further, where users of a language must explicitly decide how user-defined types will work with specific operators, more work must be done by a user to produce a functional program in the language.

In view of the foregoing there is a need for a system that overcomes the drawbacks of the prior art.

SUMMARY OF THE INVENTION

During compilation, an operator Op may be encountered which has been called on one or more operands of user-defined types, but where the user-defined types have no definition for operator Op. If at least one operand is of a user-defined type, and if there is no definition for the operator contributed by the user-defined type, the compiler will attempt to choose a target type R such that Op resolves to a type-consistent operation.

According to one embodiment of the invention, in order to continue the compilation without error, the widening conversions for each operand are examined to determine if any widening conversions of any operands would result in types for which the operator Op is defined. If not, both the narrowing and the widening conversions of each operand are considered, to determine if conversions of either or both operands would result in types for which the operator Op is defined.

If only widening conversions are used, the most encompassed possible result type is selected as the target type R. If a narrowing conversion is used, the most encompassing possible result type is selected as the target type R.

In order to perform the operation, each operand is converted to the target type R. The operation is then performed using the converted operands.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

In order to allow compilation of operators with user-defined operands, a compiler includes a resolution module which resolves the operator. Widening conversions of all operands are first examined, to see if any such widening conversions will result in types for which the operator is defined. If no types are found, narrowing and widening conversions of all operands are examined, to see if any conversions result in types for which the operator is defined. A target type is selected from the possible result types.

Exemplary Computing Arrangement

Figure 1:
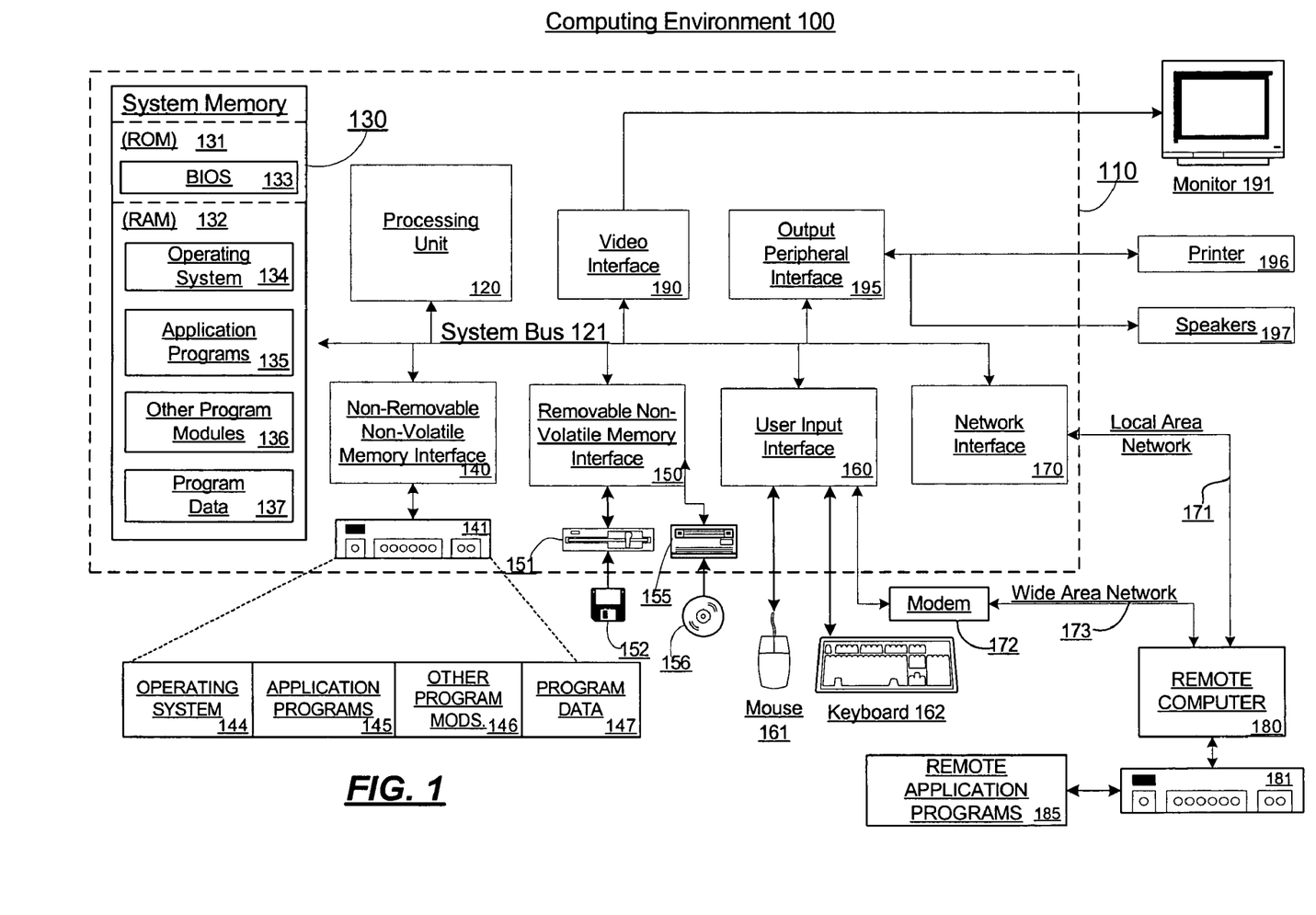
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Resolving Operators with a User-Defined Operand

Figure 2:
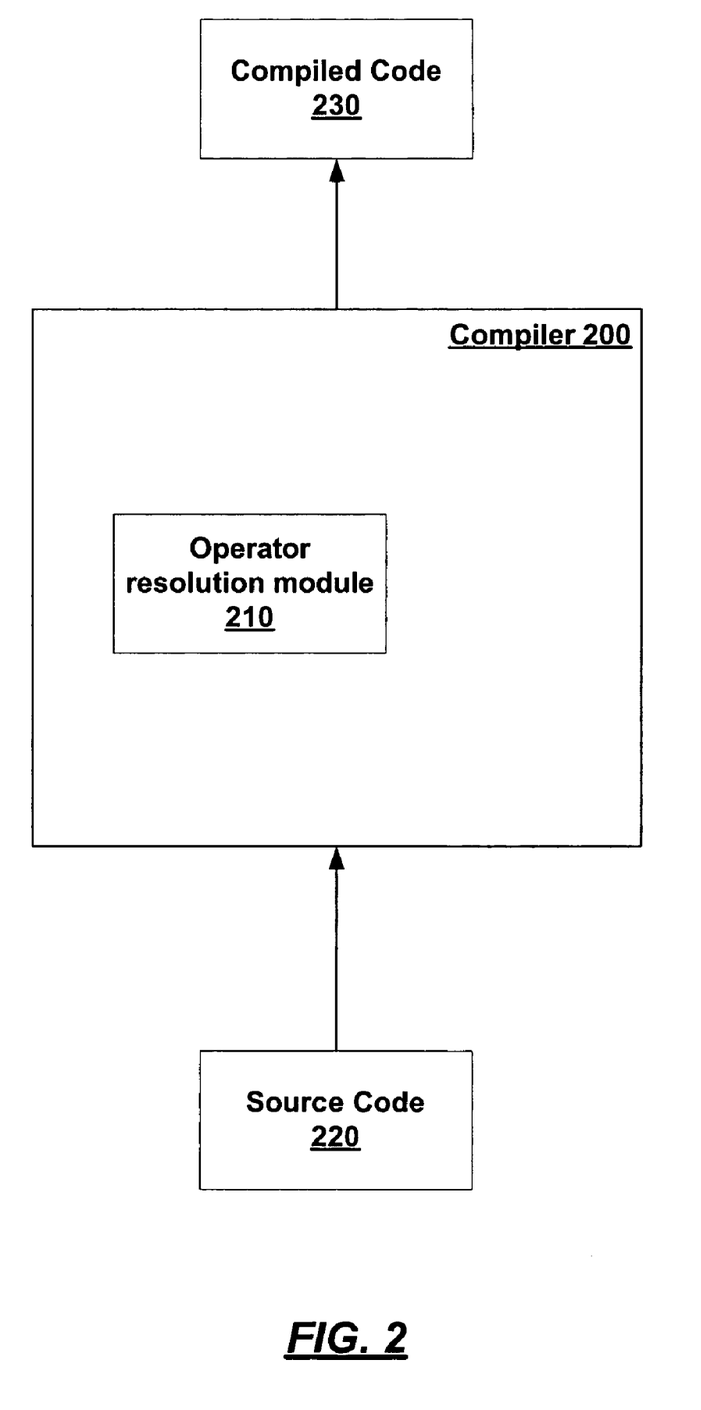
FIG. 2 is a block diagram of a compiler including an operator resolution module according to one embodiment of the invention.

FIG. 2 is a block diagram of a compiler including an operator resolution module according to one embodiment of the invention. As shown in FIG. 2, a compiler 200 receives source code 220 and compiles that code, resulting in compiled code 230. In addition to compiled code 230, output messages may also be produced. If compilation is unsuccessful, instead of compiled code 230, error messages are produced by the compiler 200.

In order to resolve operators which are being called with user-defined operands in cases where the operator is not defined over the types with which the operator is being called, operator resolution module 210 is called. For example, an operator Op may be called with n operands, $O_1$ through $O_n$. Each operand is an expression of a specific type $T_1$ through $T_n$, where for any m, $O_m$ is of type $T_m$. Where the techniques of the invention are used to resolve the operator, at least one of types $T_1$ through $T_n$ is a user-defined type. While this call may be expressed in different ways depending on the language being used, we will represent it as Op $(O_1, O_2, \ldots O_n)$. This is not intended to limit the techniques of the invention to operators with a number of operands greater than a certain number, the techniques may be used with an operator with any number of operands. For example, the techniques may be used with an operator operating on two operands (one acting as a binary operator) and n will equal two. The techniques may also be used with an operator operating on one operand (one acting as a unary operator) and n will equal one.

In order to determine how to compile the code including this call to the operator Op, candidate user-defined definitions for the operator Op provided in user definitions for any user-defined types from among the types $T_1$ through $T_n$ are examined. If there is one appropriate candidate user-defined operator, then that is used. If there are a number of possible candidate user-defined operators, standard method overload resolution rules are used to attempt to select a best operator. However, if there are no possible candidate user-defined operators, operator resolution module 210 is used to determine how to resolve the operator.

Figure 3:
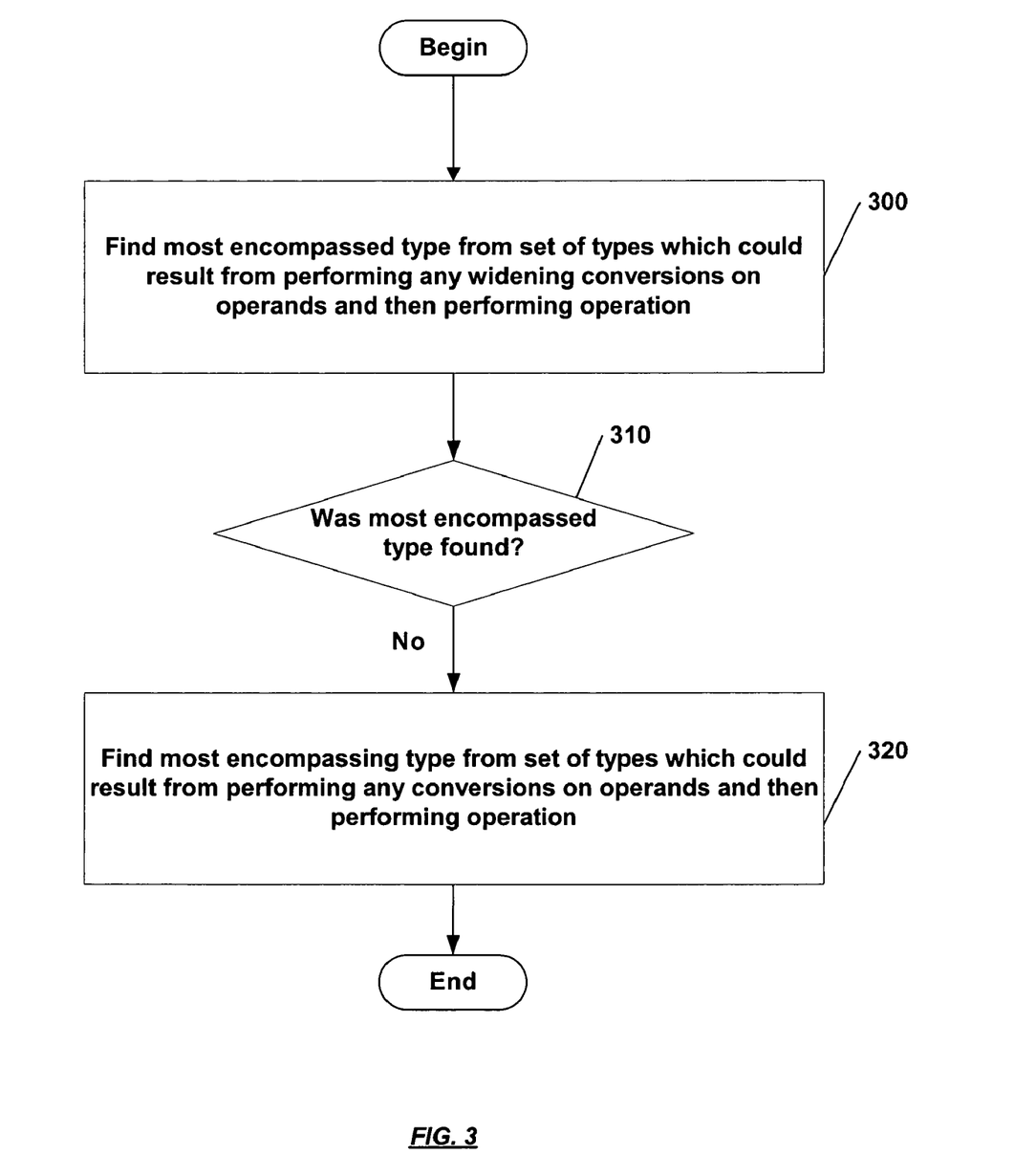
FIG. 3 is a flow diagram describing a method to resolve the operator in this situation according to one embodiment of the invention.

In order to perform the resolution, as shown in FIG. 3, in step 300, a most encompassed type is found from the set of types which could result from the operation of the operator on hypothetical operands, where each hypothetical operand is a type which results from a widening type conversion from a corresponding actual operand. A determination is made whether that first set of types is empty in step 310. If so, in step 320, a most encompassing type is found from a second set of types which could result from the operation of the operator on hypothetical operands which result from any type conversion (i.e. both widening and narrowing conversions) from a corresponding actual operand.

Figure 4:
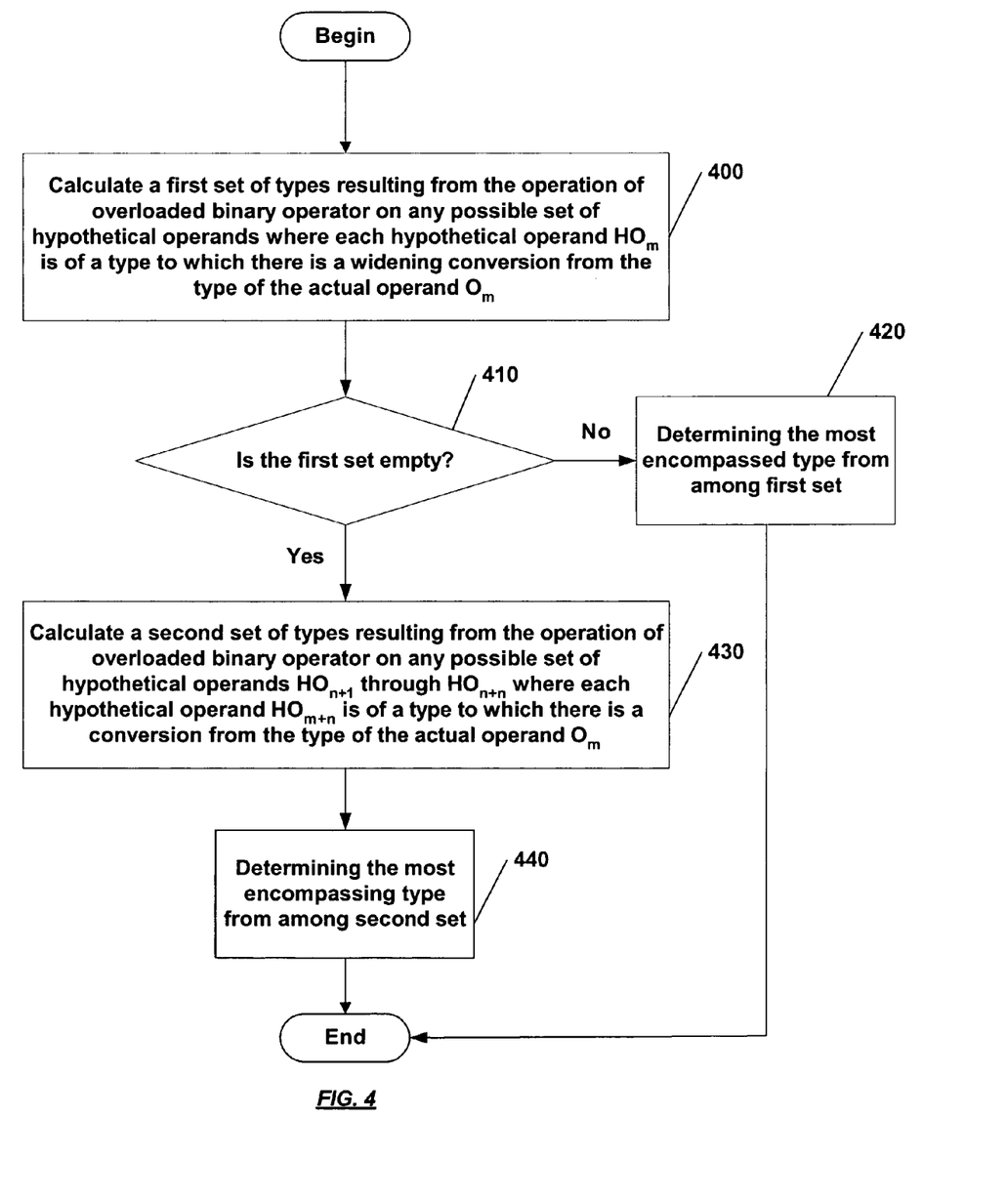
FIG. 4 is a flow diagram describing a method to resolve the operator in this situation according to one embodiment of the invention.

FIG. 4 is a flow diagram describing a method to resolve the operator in this situation according to one embodiment of the invention. First, as seen in step 400, a first set of types which could result from the operation when widening conversions on any or all of the operands have been performed is determined. For each operand $O_m$ of type $T_m$, there is at least one type to which an expression of type $T_m$ could be converted using a widening conversion—the type $T_m$ itself. There also may be additional widening conversions possible for type $T_m$. For each operand type $T_m$, these conversions are considered, to determine whether a hypothetical operand which has been produced by a widening conversion could be used to resolve the operator.

Thus, for each operand, $O_m$, a set of types is produced. All possible combinations of these types are examined, to see if the operator is defined for any of these. Thus if there is a widening conversion from $O_1$ to $HO_1$, from $O_2$ to $HO_2$, … and from $O_n$ to $HO_n$, the operator is examined to see if the operator is defined for an expression of the form Op $(HO_1, HO_2, \ldots HO_n)$. A table such as Table 1 for the operator Op will be examined to determine if it is defined for such an operator, and what the resulting type will be. This is done for all possible combinations of types of hypothetical operands. No actual conversion of the hypothetical operands is necessary, only the determination of what the resulting type would be. Thus, this first set, calculated in step 400, contains all possible resulting types of the operation Op on all possible combinations of types of hypothetical operands using widening conversions.

In step 410, it is determined whether the first set was empty. If, for example, no possible widening conversions of operands could result in hypothetical operands over which the operation has been defined, the first set will be empty. If the first set is not empty, step 420, the most encompassed type from among the types in the first set is selected as a "target type."

If a widening conversion exists from a type A to a type B, then A is said to be encompassed by B, and B is said to encompass A. In a set of types, the most encompassed type is the one type that is encompassed by all other types in the set. If no one type exists which is encompassed by all other types, then there is no most encompassed type in the set. Thus, the most encompassed type is the type in the set that can be converted to each of the other types using widening conversions.

If the first set was empty in step 420, a second set of types is calculated. This second set is of types which could result from the operation where any conversion—widening or narrowing—on any of the operands has been performed. Thus, for each operand, $O_m$, a set of types is again produced. All possible combinations of these types are examined, to see if the operator is defined for any of these. If there is any conversion from $O_1$ to $HO_{1+n}$, from $O_2$ to $HO_{2+n}$, … and from $O_n$ to $HO_{n+n}$, the operator is examined to see if the operator is defined for an expression of the form Op $(HO_{1+n}, HO_{2+n}, \ldots HO_{n+n})$. For each operand $O_m$ of type $T_m$, all conversions are considered, to determine whether a hypothetical operand $HO_{m+n}$ which has been produced by a narrowing conversion could be used to resolve the operator, because the use of only widening conversions did not produce a possible resolution for the operator. Again, a table such as Table 1 for the operator Op will be examined to determine if it is defined for such an operator, and what the resulting type will be. This is done for all possible combinations of types of hypothetical operands. Thus this second set, calculated in step 430, contains all possible resulting types of the operation Op on all possible combinations of types of hypothetical operands using any conversions—narrowing or widening.

In step 440, the most encompassing type from among the second step is selected as the target type. In a set of types, the most encompassing type is the one type that encompasses all other types in the set. If no one type exists which encompasses all other types, then there is no most encompassing type in the set. Thus, the most encompassing type is the type in the first set to which each of the other types can be converted using widening conversions.

The target type is then used. In one embodiment, this target type must be an intrinsic type, and only intrinsic types are considered to be members of the first set or the second set of types. If no target type has been found, it is determined that the operator resolution failed, and a compile-time error occurs. Otherwise, the operands are each converted to the target type, and the operation Op is performed on these converted operands in the target type.

Resolving a Binary Operator with a User-Defined Operand

Figure 5:
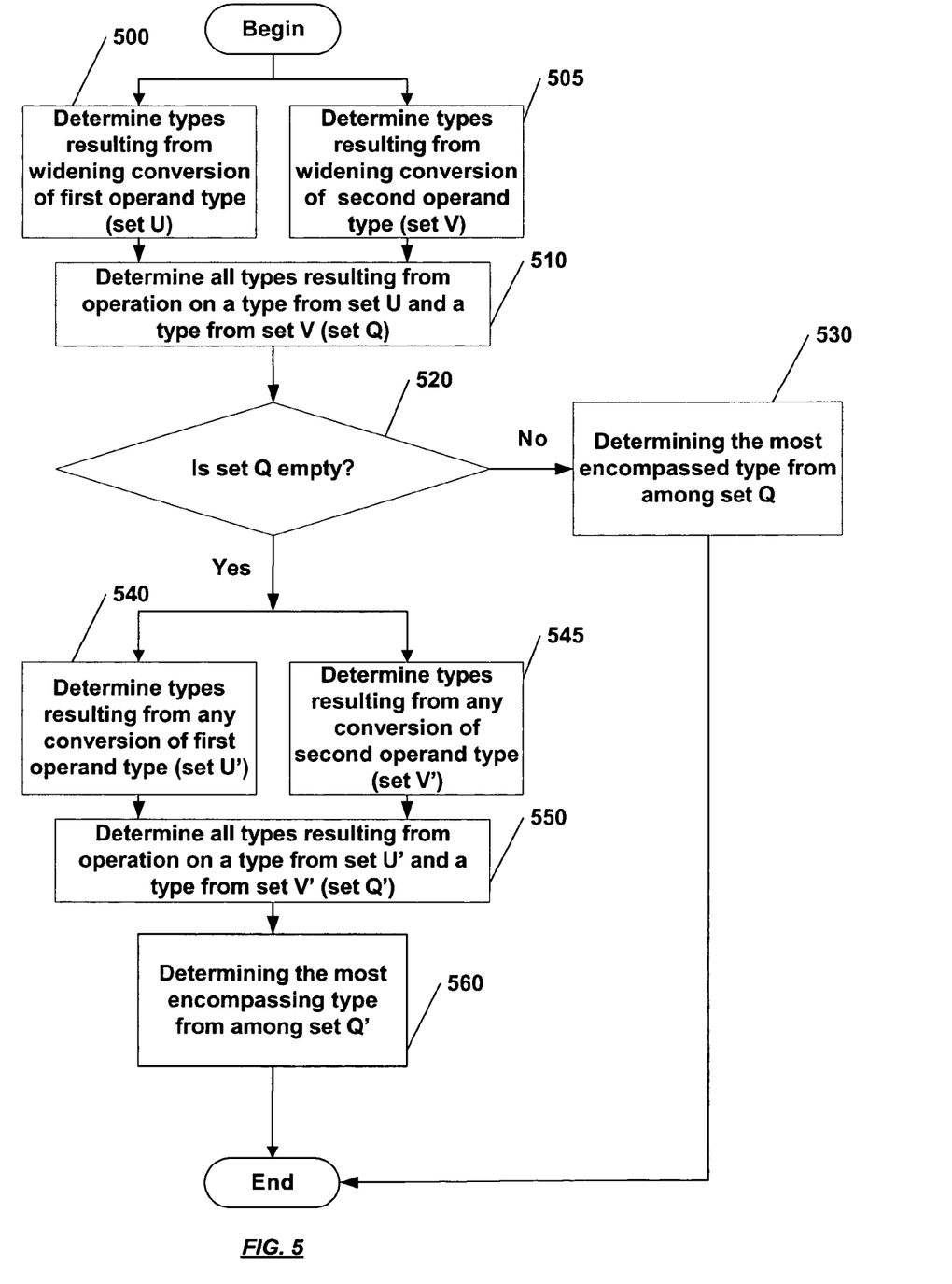
FIG. 5 is a flow diagram describing a method to resolve a binary operator according to one embodiment of the invention.

FIG. 5 is a flow diagram describing a method to resolve a binary operator according to one embodiment of the invention. Where a binary operator is being resolved, only two operands are being considered. For example, "x Bop y" may be an operation in the source code, where Bop is a binary operator, x is an expression of type X, and y is an expression of type Y. When no user-defined operation is found for Bop and these types, the following steps are performed. First, in step 500, a first set of types, set U, is determined, which is the set of all types to which there is a widening conversion from type X. At the same time, in step 505, a second set, set V, of types is determined, which is the set of all types to which there is a widening conversion from type Y. In step 510, a third set of types, set Q, is then determined. This set Q includes all types which can result from evaluating the expression u Bop v, where u is an operand of a type included in set U, and v is an operand of a type included in set V.

In step 520, it is determined whether set Q is empty. If it is not empty, then in step 530 the most encompassed type in set Q is chosen as the target type.

If set Q is empty in step 520, then in step 540, a fourth set of types, set U', is determined, which is the set of all types to which there is any conversion from type X. At the same time, in step 545, a fifth set, set V', of types is determined, which is the set of all types to which there is any conversion from type Y. In step 550, a sixth set of types, set Q', is then determined. This set Q' includes all types which can result from evaluating the expression u' Bop v', where u' is an operand of a type included in set U', and v' is an operand of a type included in set V'. In step 560, the most encompassing type in set Q' is chosen as the target type.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method used by a compiler stored in a computer system, that when executed by a processor on the computer system, the method performs operations of determining a target type in an expression comprising an operator and at a plurality of expression operands, where said operands comprise n operands $O_1$ through $O_n$, where n is greater than or equal to one, and where each operand $O_m$ is of a specific type $T_m$, in a loosely-typed programming language, the method comprising the steps of:

determining that the operator is not defined over at least one operand;

determining as said target type a most encompassed type from among a first set of types of loosely-typed operands, where said first set of types comprises all resulting types of all first variant expressions, where each of said first variant expressions comprises said target expression with at least one of said expression operands, at least one expression operand being a user-defined type, replaced using widening type conversion, if said first set is not empty, said determining a most encompassed type comprising:

calculating said first set comprising types resulting from the operation of said operator on any possible set of hypothetical operands $HO_1$ through $HO_n$, where each hypothetical operand $HO_m$ is of a type to which there is a widening conversion from type $T_m$; and if said first set is not empty, determining as said target type a most encompassed type from among said first set;

if said first set is empty, determining as said target type a most encompassing type from among a second set of types of loosely-typed operands, where said second set of types comprises all resulting types of all second variant expressions, where each of said second variant expressions comprises said target expression with at least one of said expression operands, replaced using at least one of widening and narrowing type conversion; and assigning said target type to said operator.

2. The method of claim 1, wherein if said first set is empty, calculating a second set comprising types resulting from the operation of said operator on any possible set of hypothetical operands $HO_{n+1}$ through $HO_{n+n}$, where each hypothetical operand $HO_{n+m}$ is of a type to which there is a conversion, either narrowing or widening, from type $T_m$; and determining as said target type a most encompassing type from among said second set.

3. The method of claim 1, said method further comprising:

converting each of said operands $O_1$ through $O_n$ to said target type; and computing said operation on said converted operands $O_1$ through $O_n$.

4. The method of claim 1 where said operator is a binary operator and n equals two.

5. The method of claim 1 where said operator is a unary operator and n equals one.

6. The method of claim 1 where said target type is an intrinsic type.

7. In a compiler, a method of resolving an expression comprising an overloaded binary operator, a first operand of a first type and a second operand of a second type, in a loosely-typed programming language, comprising the steps of:

parsing the expression to determine said overloaded binary operator, the first operand and the second operand, the first operand and the second operand each being loosely typed, at least one of the set comprising the first operand and the second operand being a user-defined type;

determining that the operator is not defined over at least one of the first type and the second type;

determining a first set of types, where said first set comprises all types to which there is a widening conversion from said first type;

determining a second set of types, where said second set comprises all types to which there is a widening conversion from said second type;

determining a third set of types, where said third set comprises all types which result from an operation of said overloaded binary operator on a type from among said first set and a type from among said second set;

if said third set of types is empty, determining a fourth set of types, where said fourth set comprises all types to which there is a narrowing conversion from said first type and all types to which there is a widening conversion from said first type;

if said third set of types is empty, determining a fifth set of types, where said fifth set comprises all types to which there is a narrowing conversion from said second type and all types to which there is a widening conversion from said second type;

if said third set of types is empty, determining a sixth set of types, where said sixth set comprises all types which result from the operation of said overloaded binary operator on a type from among said fourth set and a type from among said fifth set;

if said third set of types is not empty, selecting the most encompassed type in said third set as a target type;

if said third set of types is empty, selecting the most encompassing type in said sixth set of types as said target type; and assigning said target type to said overloaded binary operator.

8. The method of claim 7, said method further comprising:
converting said first operand to said target type;
converting said second operand to said target type; and
computing said operation of said overloaded binary operator on said converted first operand and said converted second operand.

9. A computer-readable storage medium containing computer executable instructions for a compiler to resolve a target expression comprising an operator and a plurality of expression operands in a loosely-typed programming language, where said operands comprise n operands $O_1$ through $O_n$, where n is greater than or equal to one, and where each operand $O_m$ is of a specific type $T_m$, the computer-executable instructions to perform acts comprising:

determining that the operator is not defined over at least one expression operand;

determining as a target type a most encompassed type from among a first set of types of loosely-typed operands, where said first set of types comprises all resulting types of all first variant expressions, where each of said first variant expressions comprises said target expression with at least one of said expression operands, at least one of said expression operands being a user-defined type, replaced by a widening type conversion, if said first set is not empty, wherein said determining a most encompassed type comprises:

calculating said first set comprising types resulting from the operation of said operator on any possible set of hypothetical operands $HO_1$ through $HO_n$, where each hypothetical operand $HO_m$ is of a type to which there is a widening conversion from type $T_m$; and if said first set is not empty, determining as said target type a most encompassed type from among said first set;

if said first set is empty, determining as said target type a most encompassing type from among a second set of types of loosely-typed operands, where said second set of types comprises all resulting types of all second variant expressions, where each of said second variant expressions comprises said target expression with at least one of said expression operands replaced using at least one of widening and narrowing type conversion; and assigning said target type to said operator.

10. The computer-readable storage medium of claim 9, wherein:

if said first set is empty, calculating a second set comprising types resulting from the operation of said operator on any possible set of hypothetical operands $HO_{n+1}$ through $HO_{n+n}$, where each hypothetical operand $HO_{n+m}$ is of a type to which there is a conversion, either narrowing or widening, from type $T_m$; and determining as said target type a most encompassing type from among said second set.

11. The computer-readable storage medium of claim 9, said acts further comprising:
converting each of said operands $O_1$ through $O_n$ to said target type; and
computing said operation on said converted operands $O_1$ through $O_n$.

12. The computer-readable storage medium of claim 9 where said operator is a binary operator and n equals two.

13. The computer-readable storage medium of claim 9 where said operator is a unary operator an n equals one.

14. The computer-readable storage medium of claim 9 where said target type is an intrinsic type.

15. A computer-readable storage medium containing computer executable instructions for a compiler to resolve an expression comprising an overloaded binary operator, a first operand of a first type and a second operand of a second type, in a loosely-typed programming language, the computer-executable instructions to perform acts comprising:

parsing the expression to determine the overloaded binary operator, the first operand and the second operand, the first operand and the second operand each being loosely typed, at least one of the first operand and the second operand being a user-defined type;

determining that the operator is not defined over at least one of the first type and the second type;

determining a first set of types, where said first set comprises all types to which there is a widening conversion from said first type;

determining a second set of types, where said second set comprises all types to which there is a widening conversion from said second type;

determining a third set of types, where said third set comprises all types which result from an operation of said overloaded binary operator on a type from among said first set and a type from among said second set;

if said third set of types is empty, determining a fourth set of types, where said fourth set comprises all types to which there is a narrowing conversion from said first type and all types to which there is a widening conversion from said first type;

if said third set of types is empty, determining a fifth set of types, where said fifth set comprises all types to which there is a narrowing conversion from said second type and all types to which there is a widening conversion from said second type;

if said third set of types is empty, determining a sixth set of types, where said sixth set comprises all types which result from the operation of said overloaded binary operator on a type from among said fourth set and a type from among said fifth set;

if said third set of types is not empty, selecting the most encompassed type in said third set as a target type; and if said third set of types is empty, selecting the most encompassing type in said sixth set of types as said target type; and assigning said target type to said overloaded binary operator.

16. The computer-readable storage medium of claim 15, said acts further comprising:

converting said first operand to said target type;

converting said second operand to said target type; and computing said operation of said overloaded binary operator on said converted first operand and said converted second operand.

17. A system, comprising:

a microprocessor, a computer readable memory, the memory containing instructions for determining a target type in an expression with an overloaded operator and at least one expression operand, where said operands comprise n operands $O_1$ through $O_n$, where n is greater than or equal to one, and where each operand $O_m$ is of a specific type $T_m$, further comprising:

determining that the operator is not defined over at least one expression operand;

determining as a target type a most encompassed type from among a first set of types of loosely-typed operands, where said first set of types comprises all resulting types of all first variant expressions, where each of said first variant expressions comprises said target expression with at least one of said expression operands, at least one expression operand is a user-defined type, replaced by a widening type conversion, if said first set is not empty, wherein said determining the most encompassed type comprises:

calculating said first set comprising types resulting from the operation of said overloaded operator on any possible set of hypothetical operands $HO_1$ through $HO_n$, where each hypothetical operand $HO_m$ is of a type to which there is a widening conversion from type $T_m$; and if said first set is not empty, determining as said target type a most encompassed type from among said first set;

if said first set is empty, determining as said target type a most encompassing type from among a second set of types of loosely-typed operands, where said second set of types comprises all resulting types of all second variant expressions, where each of said second variant expressions comprises said target expression with at least one of said expression operands replaced using at least one of widening and narrowing type conversion; and assigning said target type to said overloaded operator.

18. The system of claim 17 wherein said memory further comprises instructions for:

if said first set is empty, calculating a second set comprising types resulting from the operation of said overloaded operator on any possible set of hypothetical operands $HO_{n+1}$ through $H_{n+n}$, where each hypothetical operand $HO_{n+m}$ is of a type to which there is a conversion, either narrowing or widening, from type $T_m$; and if said first set is empty, determining as said target type a most encompassing type from among said second set.

19. The system of claim 17, wherein said memory further comprises instructions for:

converting each of said operands $O_1$ through $O_n$ to said target type; and computing an operation of said overloaded operator on said converted operands $O_1$ through $O_n$.

20. The system of claim 17 where said overloaded operator is a binary operator and n equals two.

21. The system of claim 17 where said overloaded operator is a unary operator and n equals one.

22. The system of claim 17 where said target type is an intrinsic type.

23. A system, comprising:

a microprocessor, a computer readable memory, the memory containing instructions for resolving an expression comprising an overloaded binary operator, a first operand of a first type and a second operand of a second type, the first operand and the second operand each being loosely-typed, further comprising:

determining that the operator is not defined over at least one of the first type and the second type;

determining a first set of types, where said first set comprises all types to which there is a widening conversion from said first type;

determining a second set of types, where said second set comprises all types to which there is a widening conversion from said second type;

determining a third set of types, where said third set comprises all types which result from an operation of said overloaded binary operator on a type from among said first set and a type from among said second set;

if said third set of types is empty, determining a fourth set of types, where said fourth set comprises all types to which there is a narrowing conversion from said first type and all types to which there is a widening conversion from said first type;

if said third set of types is empty, determining a fifth set of types, where said fifth set comprises all types to which there is a narrowing conversion from said second type and all types to which there is a widening conversion from said second type;

if said third set of types is empty, determining a sixth set of types, where said sixth set comprises all types which result from the operation of said overloaded binary operator on a type from among said fourth set and a type from among said fifth set;

if said third set of types is not empty, selecting the most encompassed type in said third set as a target type; and if said third set of types is empty, selecting the most encompassing type in said sixth set of types as said target type; and assigning said target type to said overloaded binary operator.

24. The system of claim 23, wherein said memory further comprises instructions for:

converting said first operand to said target type;

converting said second operand to said target type; and computing said operation of said overloaded binary operator on said converted first operand and said converted second operand.

* * * * *

UNITED STATES PATENT AND TRADEMARK OFFICE
CERTIFICATE OF CORRECTION

PATENT NO. : 7,620,944 B2  Page 1 of 1
APPLICATION NO. : 10/699327
DATED : November 17, 2009
INVENTOR(S) : Cameron Beccario et al.

It is certified that error appears in the above-identified patent and that said Letters Patent is hereby corrected as shown below:

In column 13, line 63, in Claim 18, delete "$H_{n+n}$" and insert -- $HO_{n+n}$ --, therefor.

Signed and Sealed this
First Day of February, 2011

David J. Kappos
*Director of the United States Patent and Trademark Office*